United States Patent
Turner et al.

(10) Patent No.: US 10,964,354 B1
(45) Date of Patent: Mar. 30, 2021

(54) OXIDIZING OR REDUCING ATMOSPHERE FOR HEAT-ASSISTED MAGNETIC RECORDING

(71) Applicant: Seagate Technology LLC, Cupertino, CA (US)

(72) Inventors: Robert D. Turner, Thornton, CO (US); Yuhang Cheng, Edina, MN (US); Peter W. Kanas, Berkeley, CA (US); Martin Liam McGarry, Ballymena (GB); Peter Kevin McGeehnin, Donegal (IE); Kevin R. Heim, Eden Prairie, MN (US); Edward Charles Gage, Lakeville, MN (US); Shaikh Mubassar Ali, Minnetonka, MN (US); Huazhou Lou, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/387,070

(22) Filed: Apr. 17, 2019

Related U.S. Application Data

(60) Provisional application No. 62/659,878, filed on Apr. 19, 2018.

(51) Int. Cl.
| | |
|---|---|
| G11B 33/14 | (2006.01) |
| G11B 13/08 | (2006.01) |
| G11B 5/012 | (2006.01) |
| G11B 5/31 | (2006.01) |
| G11B 5/00 | (2006.01) |

(52) U.S. Cl.
CPC .......... *G11B 33/1446* (2013.01); *G11B 5/012* (2013.01); *G11B 5/314* (2013.01); *G11B 13/08* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,433,965 B1 | 8/2002 | Gopinathan et al. | |
| 6,785,089 B2 | 8/2004 | Bernett et al. | |
| 8,094,409 B2 | 1/2012 | Feliss et al. | |
| 8,885,287 B1 * | 11/2014 | Koike et al. ....... | G11B 33/1446 360/97.12 |
| 9,025,284 B1 * | 5/2015 | Sill et al. .......... | G11B 33/1466 360/99.08 |
| 9,036,307 B1 | 5/2015 | Hoshiya et al. | |

(Continued)

*Primary Examiner* — Craig A. Renner
(74) *Attorney, Agent, or Firm* — Mueting Raasch Group

(57) ABSTRACT

A heat-assisted magnetic recording device is disposed in a hermetically sealed enclosure. The device includes a slider comprising a reader, a writer, and an optical waveguide configured to couple light from a light source to a near-field transducer situated at or near an air bearing surface of the slider. The near-field transducer comprises an enlarged portion and a peg extending from the enlarged portion in a direction of the air bearing surface. A fill gas is provided within the enclosure. The fill gas comprises a mixture of a low-density, inert gas and at least one gas that oxidizes carbon, where the total carbon oxidizing gas concentration of the fill gas is 3-50% by volume. In certain embodiments, the fill gas comprises a hydrogen concentration sufficient to retard oxidation of the peg when the peg is at an operating temperature associated with write operations.

13 Claims, 13 Drawing Sheets

(56) References Cited

U.S. PATENT DOCUMENTS

| | | | |
|---|---|---|---|
| 9,058,851 B1* | 6/2015 | Hanke | G11B 33/1486 |
| 10,468,071 B1* | 11/2019 | Tasaka et al. | G11B 33/1466 |
| 2007/0109686 A1 | 5/2007 | Jose et al. | |
| 2013/0129609 A1 | 5/2013 | Basini et al. | |
| 2016/0351210 A1* | 12/2016 | Blaber et al. | G11B 5/314 |
| 2017/0221511 A1* | 8/2017 | Dai et al. | G11B 5/41 |
| 2019/0313065 A1* | 10/2019 | Kitade et al. | G11B 33/1466 |
| 2020/0090683 A1* | 3/2020 | Tomoda et al. | G11B 5/6082 |

* cited by examiner

OXIDIZING OR REDUCING ATMOSPHERE FOR HEAT-ASSISTED MAGNETIC RECORDING

RELATED APPLICATIONS

This application claims the benefit of provisional Patent Application Ser. No. 62/659,878, filed on Apr. 19, 2018, which is incorporated herein by reference in its entirety.

SUMMARY

Various embodiments are directed to an apparatus comprising a hermetically sealed enclosure with a heat-assisted magnetic recording (HAMR) device disposed in the enclosure. The device includes a slider comprising a reader, a writer, and an optical waveguide configured to couple light from a light source to a near-field transducer situated at or near an air bearing surface of the slider. The near-field transducer comprises an enlarged portion and a peg extending from the enlarged portion in a direction of the air bearing surface. A fill gas is provided within the enclosure. The fill gas comprises a mixture of a low-density, inert gas and at least one gas that oxidizes carbon, the total carbon oxidizing gas concentration of the fill gas comprising 3-50% by volume.

Further embodiments are directed to an apparatus comprising a hermetically sealed enclosure and a heat-assisted magnetic recording device disposed in the enclosure. The device includes a slider comprising a reader, a writer, and an optical waveguide configured to couple light from a light source to a near-field transducer situated at or near an air bearing surface of the slider. The near-field transducer comprises a peg extending in a direction of the air bearing surface. A fill gas is provided within the enclosure. The fill gas comprises a concentration of 3-20% by volume of an oxidizing gas sufficient to react with carbon in the enclosure to form a carbon containing gas when the peg is at an operating temperature associated with write operations.

Additional embodiments are directed to an apparatus comprising a hermetically sealed enclosure and a heat-assisted magnetic recording device disposed in the enclosure. The device includes a slider comprising a reader, a writer, and an optical waveguide configured to couple light from a light source to a near-field transducer situated at or near an air bearing surface of the slider. The near-field transducer comprises an enlarged portion and a peg extending from the enlarged portion in a direction of the air bearing surface. The peg comprises rhodium. A fill gas is provided within the enclosure. The fill gas comprises a hydrogen concentration sufficient to retard oxidation of the peg when the peg is at an operating temperature associated with write operations.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

A computer disc drive is a sealed, carefully controlled environment. In a confined space, precision instruments are electrically controlled in tangent with magnetic fields to write and/or read a significant amount of information—areal storage densities well beyond 1 Tb/in$^2$, e.g., to 5 Tb/in$^2$ in theory. These storage densities are achieved through heat-assisted magnetic recording (HAMR), also sometimes referred to as thermal-assisted magnetic recording (TAMR), or energy assisted magnetic recording (EAMR). The HAMR recording process starts by heating a small region of the disk above Curie temperature ($T_c$) using a laser powered near-field plasmonic transducer, which can raise temperatures for certain components in the disk drive to 350-450° C. These temperatures cause reactions among materials in the recording components and/or disc drive atmosphere (e.g., the fill gas) which can generate contaminants in the drive. Those contaminants lead to performance degradation, reduced liability, and/or reduced lifetime operability. Embodiments described herein address altering the composition of the fill gas to include an oxidizing, or a reducing, gas that reacts with materials in the drive to remove contaminants. For example, an oxidizing gas reacts with carbon in the drive to minimize or prevent carbon-based deformities (holes and/or build up) on recording components. In other examples, a reducing gas is included in an amount sufficient to retard oxidation of the peg material when the peg is at an operating temperature associated with write operations.

Figure 1:
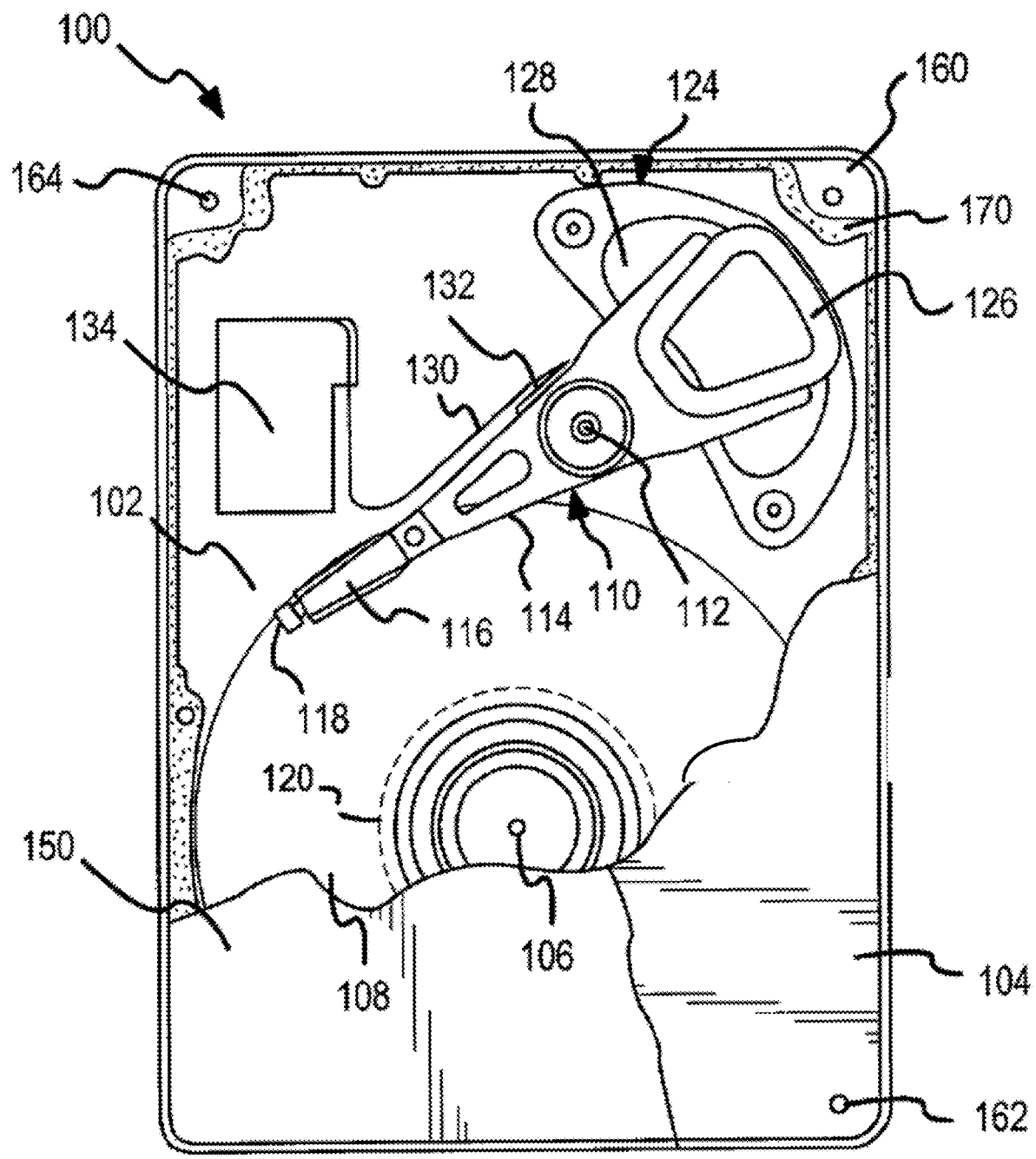
FIG. 1 shows a disc drive configured for heat-assisted magnetic recording, in accordance with various embodiments.

A disc drive 100 configured for heat-assisted magnetic recording in accordance with various embodiments is shown in FIG. 1. The disc drive 100 includes a base 102 to which various components of the disc drive 100 are mounted. A structural cover 104, shown partially cut away, cooperates with the base 102 to form a housing that defines an internal environment for the disc drive 100. The drive components include a spindle motor 106, which rotates one or more discs 108 at a constant high speed. Information is written to and read from tracks on the discs 108 through the use of an actuator assembly 110, which rotates during operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a read/write head 118, which includes a slider enabling the head 118 to fly in close proximity above the corresponding surface of the associated disc 108.

During operation, the track position of the heads 118 is controlled through the use of a voice coil motor 124, which typically includes a coil 126 attached to the actuator assembly 110, as well as one or more permanent magnets 128, which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over a park zone 120 near the inner diameter of the discs 108 when the drive motor is de-energized. The heads 118 are secured over the park zone 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected, the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board mounted to the bottom side of the disc drive 100.

Figure 2:
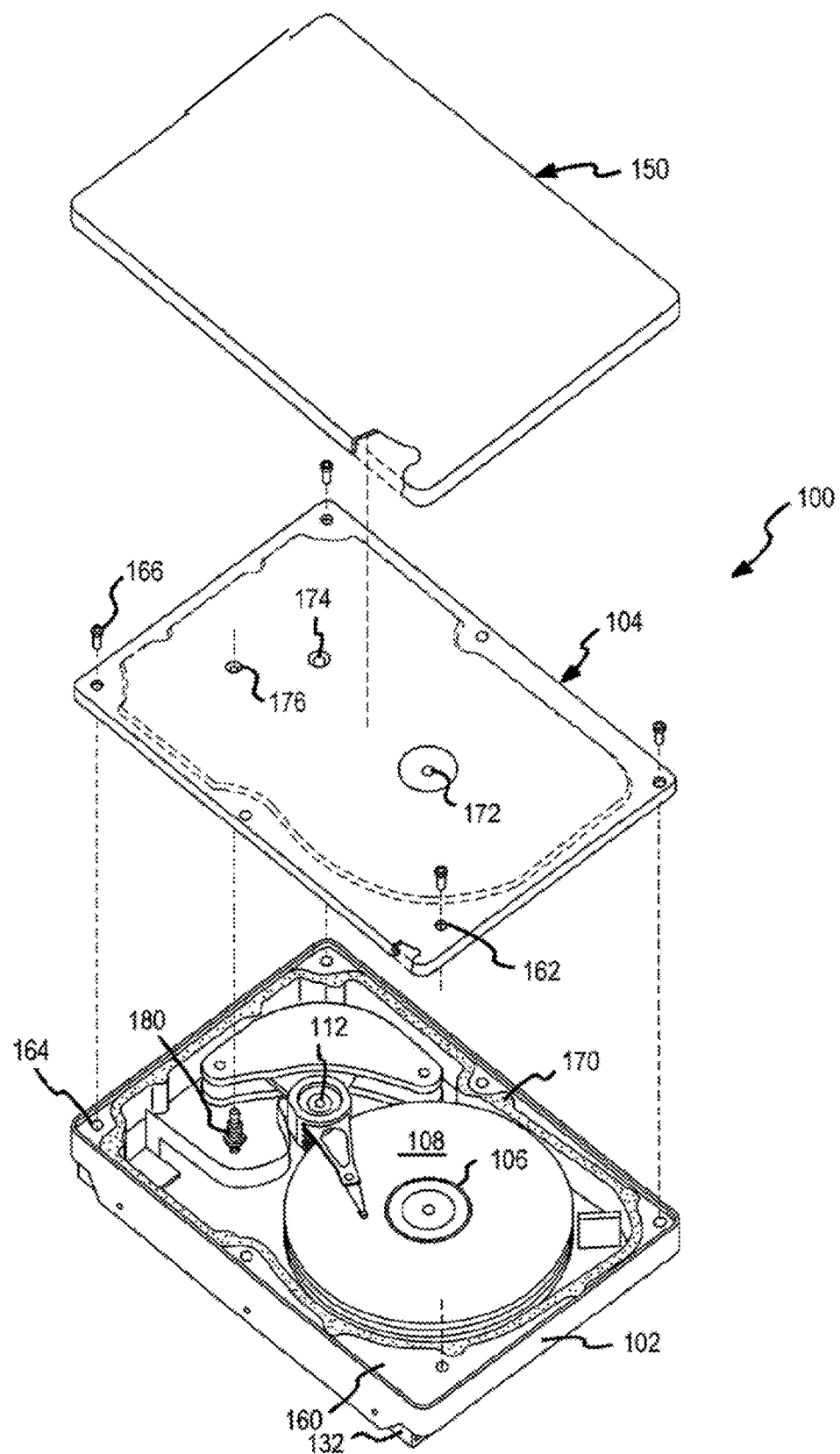
FIG. 2 is an exploded view of the disc drive shown in FIG. 1.

FIGS. 1 and 2 further illustrate a second, sealing cover 150 secured over the top of the first structural cover 104. The use of the second sealing cover 150 in combination with the structural cover 104 provides the requisite degree of sealing necessary to prevent the fill gas (which includes an oxidizing or a reducing gas in various embodiments) within the drive 100 from leaking out during the service lifetime of the drive.

FIG. 2 is an exploded view of the disc drive 100 and the two covers 104 and 150. It is noted that the base 102 includes a raised contact surface or shoulder 160 that extends around a perimeter of the base deck 102 to provide a mating surface for a perimeter of the structural cover 104. The cover 104 is preferably sculpted to match the shape of the contact surface 160, while screw holes 162 in the cover 104 match corresponding holes 164 in the raised shoulder 160 so that a plurality of screws 166 can be used to secure the cover 104 to the shoulder 160.

Prior to screwing the cover 104 to the base deck 102, a seal 170 is preferably placed on one of the raised shoulder 160 of the base 102 or the underside perimeter of the cover 104. In the embodiment shown in FIG. 2, a continuous rubber gasket seal 170 is positioned around the perimeter of the raised shoulder 160 so that the seal 170 engages the bottom surface of the cover 104 to seal the internal environment of the disc drive 100 against contaminants. The seal 170 is preferably arranged so that the screw holes 164 are positioned outside the perimeter of the seal 170 to prevent gas or contaminant leakage past the threaded screws 166. A suitable seal 170 is manufactured by the Dyneon Corp. of Oakdale, Minn.

FIG. 2 further illustrates that the structural cover 104 preferably provides structural support for the spindle motor 106 and the bearing shaft assembly 112 of the disc drive 100. Specifically, the cover 104 includes countersunk openings 172 and 174 that correspond to the spindle motor 106 and the bearing shaft assembly 112, respectively. The inclusion of the holes 172 and 174 allows the structural cover 104 to stabilize the spindle motor 106 and the actuator assembly 110. Additionally, the screws (not shown) holding the spindle motor 106 and the bearing shaft assembly 112 to the cover 104 include a pre-attached O-ring to provide a substantially gas tight seal with the corresponding holes 172 and 174 of the structural cover 104.

FIG. 2 also illustrates a location for a fill port 176 within the structural cover 104. The fill port 176 retains one end of a gas valve 180, such as a Schrader valve, while the opposite end of the valve 180 extends into the internal environment of the disc drive 100. Because the valve 180 extends downward from the cover 104, the fill port 176 is preferably located over a portion of the base deck 102 that does not contain either the discs 108 or the actuator assembly 110. As noted below, the fill port 176 need not be located in the cover 104 provided that the fill port 176 is located in a position that can be hermetically sealed. The fill port 176 is also preferably countersunk within the cover 104 so that a chuck (not shown) can mate with the valve 180 to fill the internal environment of the drive 100 with the fill gas. That is, once the cover 104 has been secured to the base deck 102 with the screws 166, and once additional screws (not shown) have been secured to the spindle motor 106 and the bearing shaft assembly 112 through the holes 172 and 174, respectively, a source of fill gas is preferably connected to the valve 180 to fill the interior of the drive with the gas. The gas supply system preferably provides a method of evacuating the drive before filling the drive with the fill gas.

As discussed above, disc drive 100 is configured as a HAMR drive. In a HAMR device, information bits are recorded in a storage layer at elevated temperatures in a specially configured magnetic media. The use of heat can overcome superparamagnetic effects that might otherwise limit the areal data density of the media. As such, HAMR devices may include near field transducers (NFTs) for delivering electromagnetic energy to a confined area of a rotating media, the area (spot size) exposed to the electromagnetic energy is heated, at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

Due to the intensity of the laser light and the small size of the NFT, the NFT and surrounding material are subject to a significant rise in temperature during writing. For example, the NFT can reach temperatures of about 350° C. to about 450° C. (e.g., ~400° C.) during write operations. The NFT (in particular the peg of the NFT), the write pole, and the area in between (referred to herein as the NFT to write pole spacing (NPS)) in a HAMR head suffers carbon related contamination. In disc drives having a fill gas of helium, or another low-density and inert gas, the lack of oxygen coupled with the laser interacting with the protective lubricating or hydrocarbon layers of the recording media and/or recording head generates amorphous carbon in the drive. This amorphous carbon creates a hole and/or condenses on the hole and/or ABS surface to form a black dot on the recording head—primarily over the NFT peg and write pole. The carbon black dot then absorbs laser light to generate high local temperatures at the NFT/write pole. Over time, this can affect the integrity and/or reliability of the NFT, for example, causing the peg to become misshapen or recess, undergo chemical changes, migrate, diffuse or otherwise be altered in a way that prevents effective coupling of energy from the near field transducer into the media.

Degradation of the NFT will adversely affect the effective service life of a HAMR read/write head. In view of this, embodiments of the disclosure are directed to apparatuses and methods that increase the thermal and/or mechanical robustness of the NFT, such as at a peg that extends towards the recording media. Embodiments are directed to a HAMR drive having a hermetically sealed enclosure comprising an oxidizing gas sufficient to react with carbon in the drive to form a carbon containing gas and prevent formation of amorphous carbon in the drive. Further embodiments are directed to a HAMR drive having a hermetically sealed enclosure comprising a reducing gas (e.g., $H_2$, CO, $CH_4$) sufficient to inhibit or prevent oxidation of a rhodium peg of an NFT at temperatures associated with HAMR operation (e.g., >300° C.).

Figure 3:
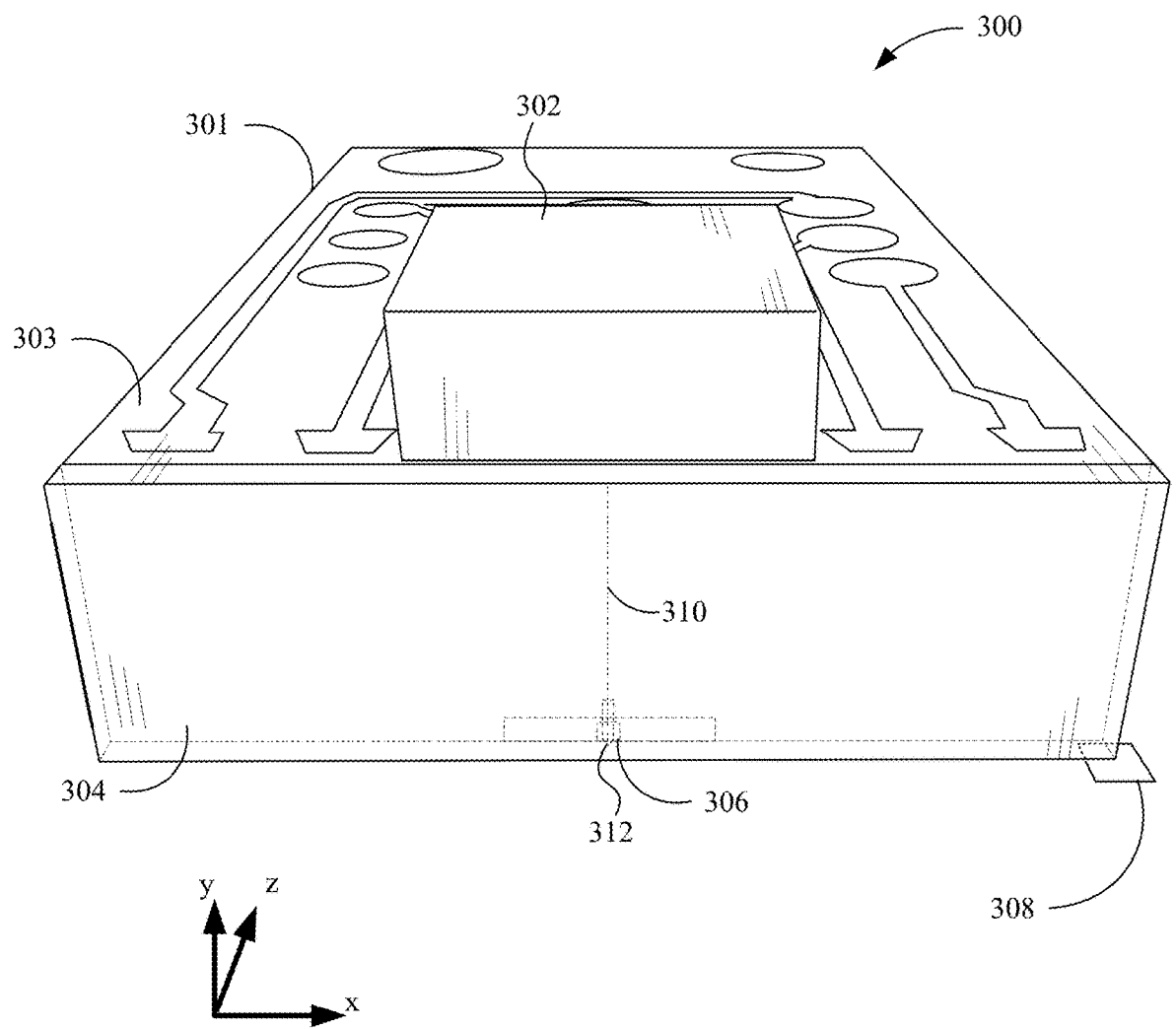
FIG. 3 is a perspective view of a HAMR slider, in accordance with various embodiments.
Figure 4A:
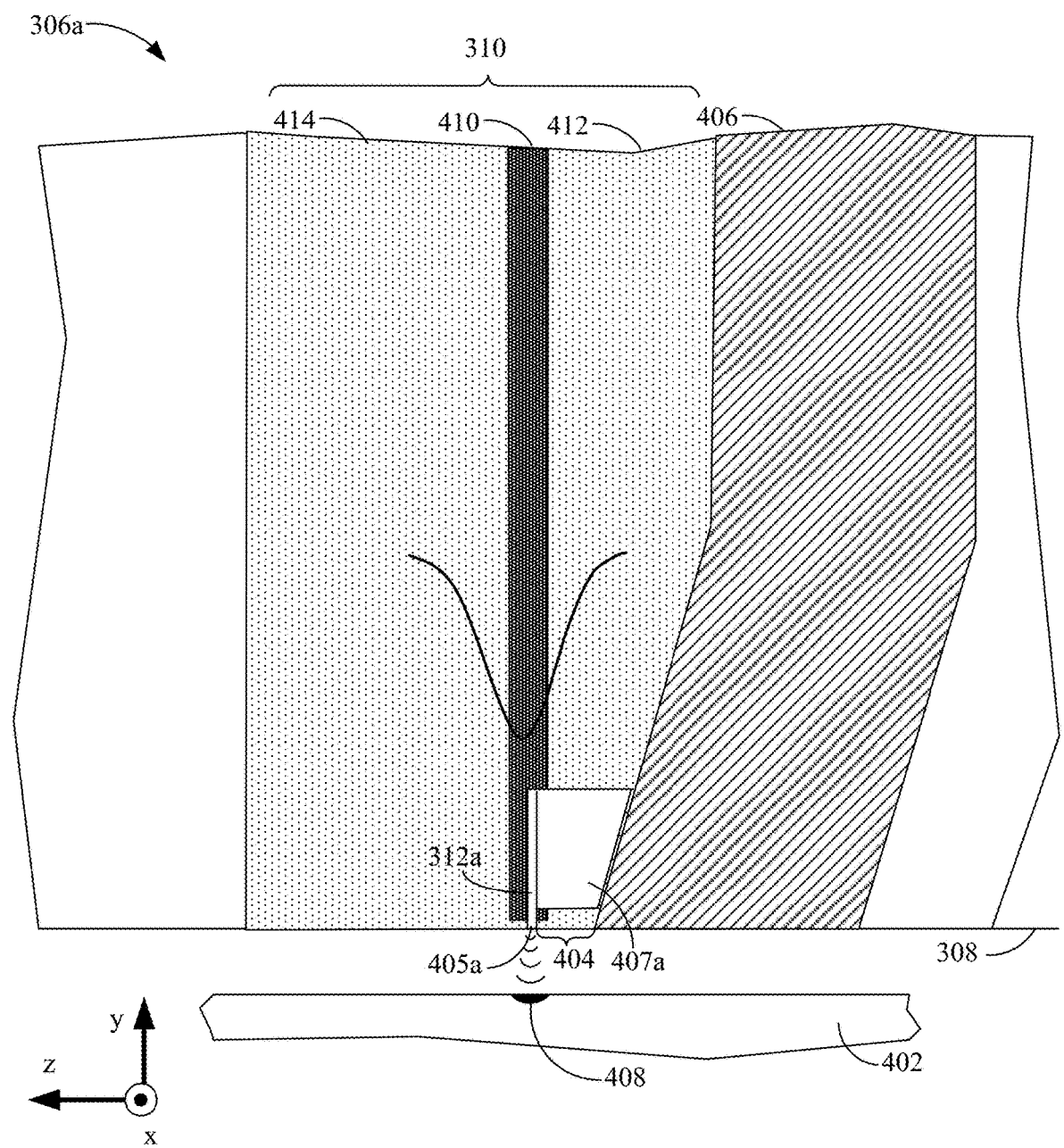
FIG. 4A is a cross-sectional view of a HAMR slider including a first configuration of a near-field transducer, in accordance with various embodiments.
Figure 4B:
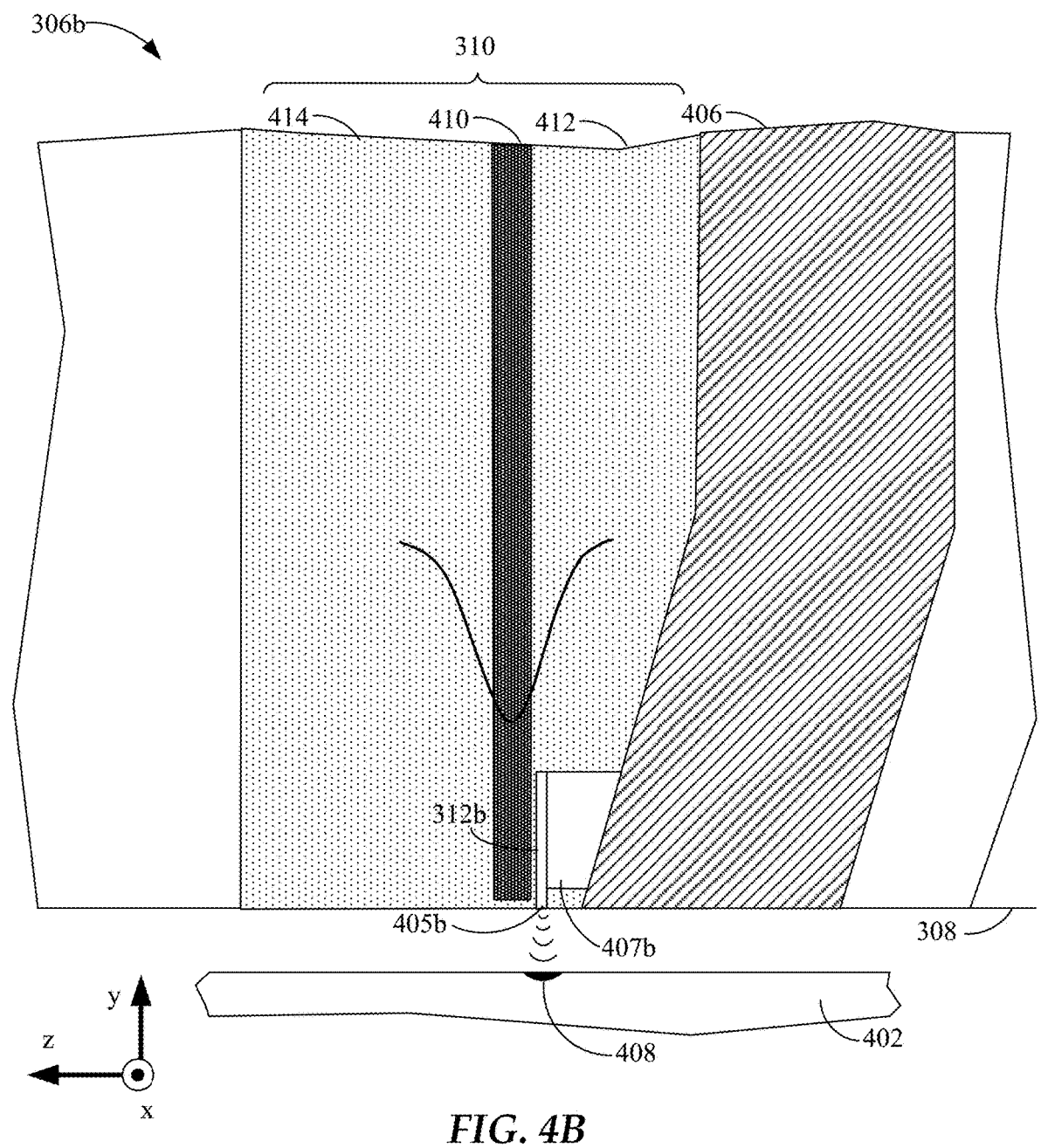
FIG. 4B is a cross-sectional view of a HAMR slider including a second configuration of a near-field transducer, in accordance with various embodiments.
Figure 4C:
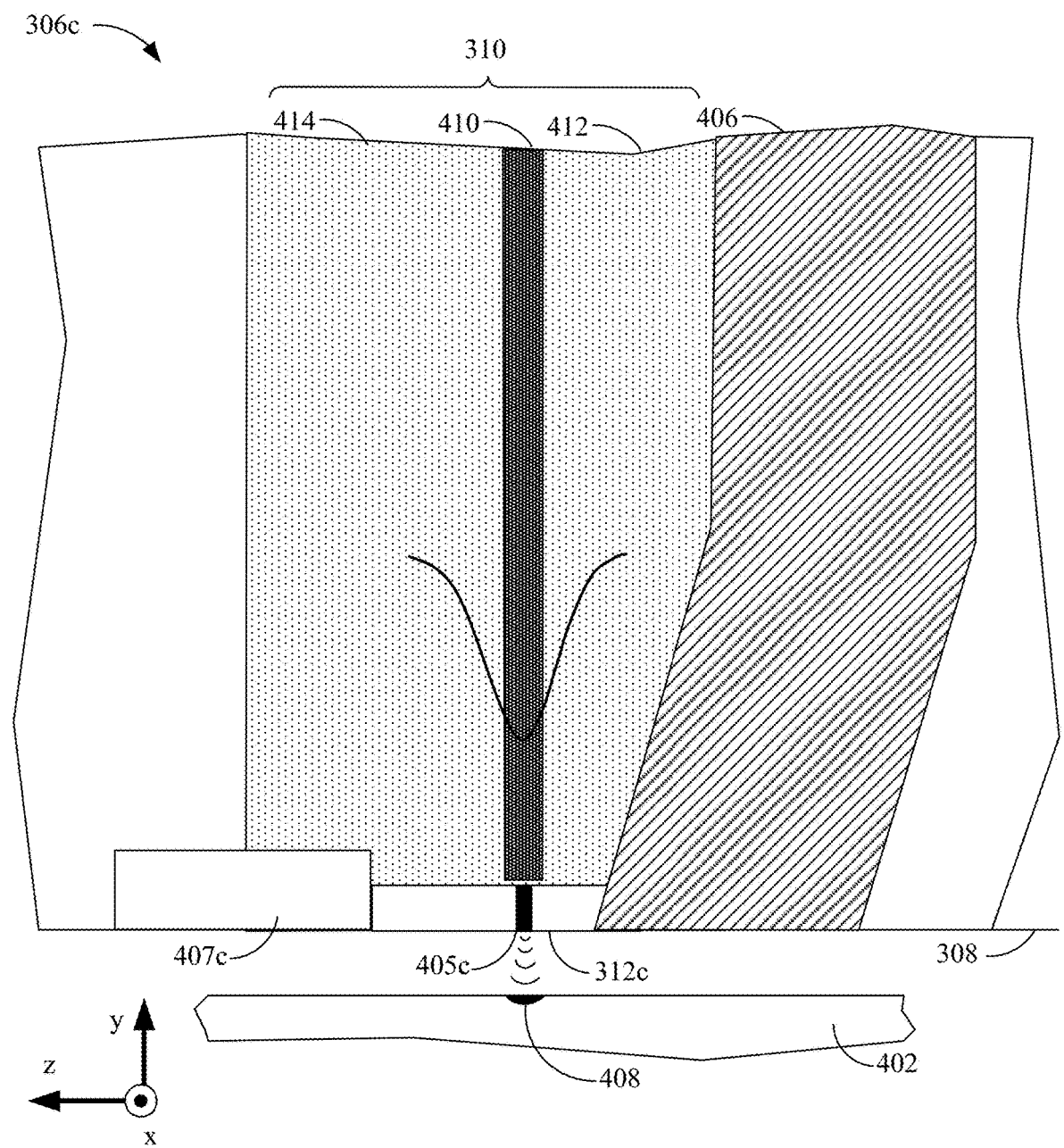
FIG. 4C is a cross-sectional view of a HAMR slider including a third configuration of a near-field transducer, in accordance with various embodiments.
Figure 4D:
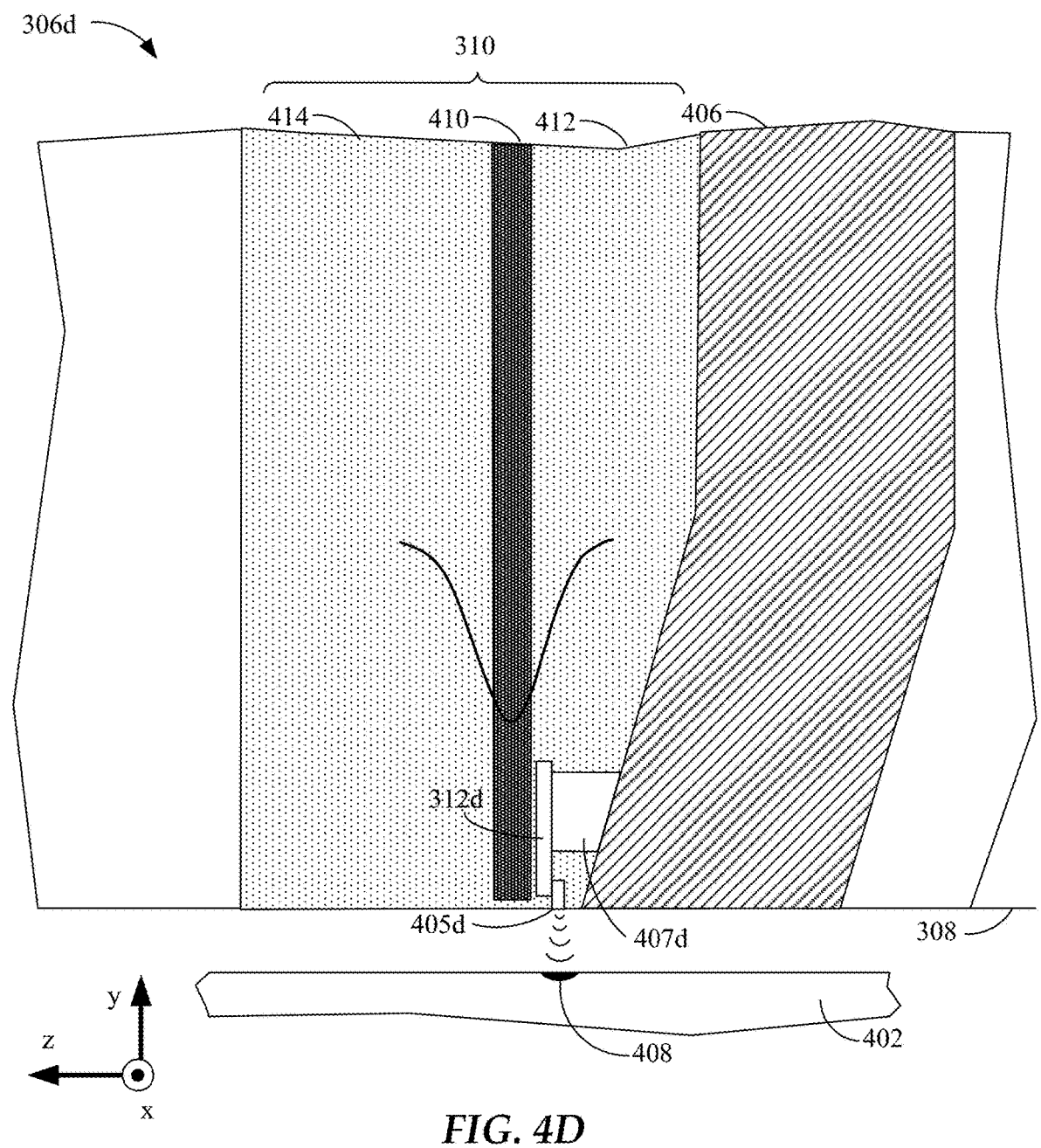
FIG. 4D is a cross-sectional view of a HAMR slider including a fourth configuration of a near-field transducer, in accordance with various embodiments.
Figure 4E:
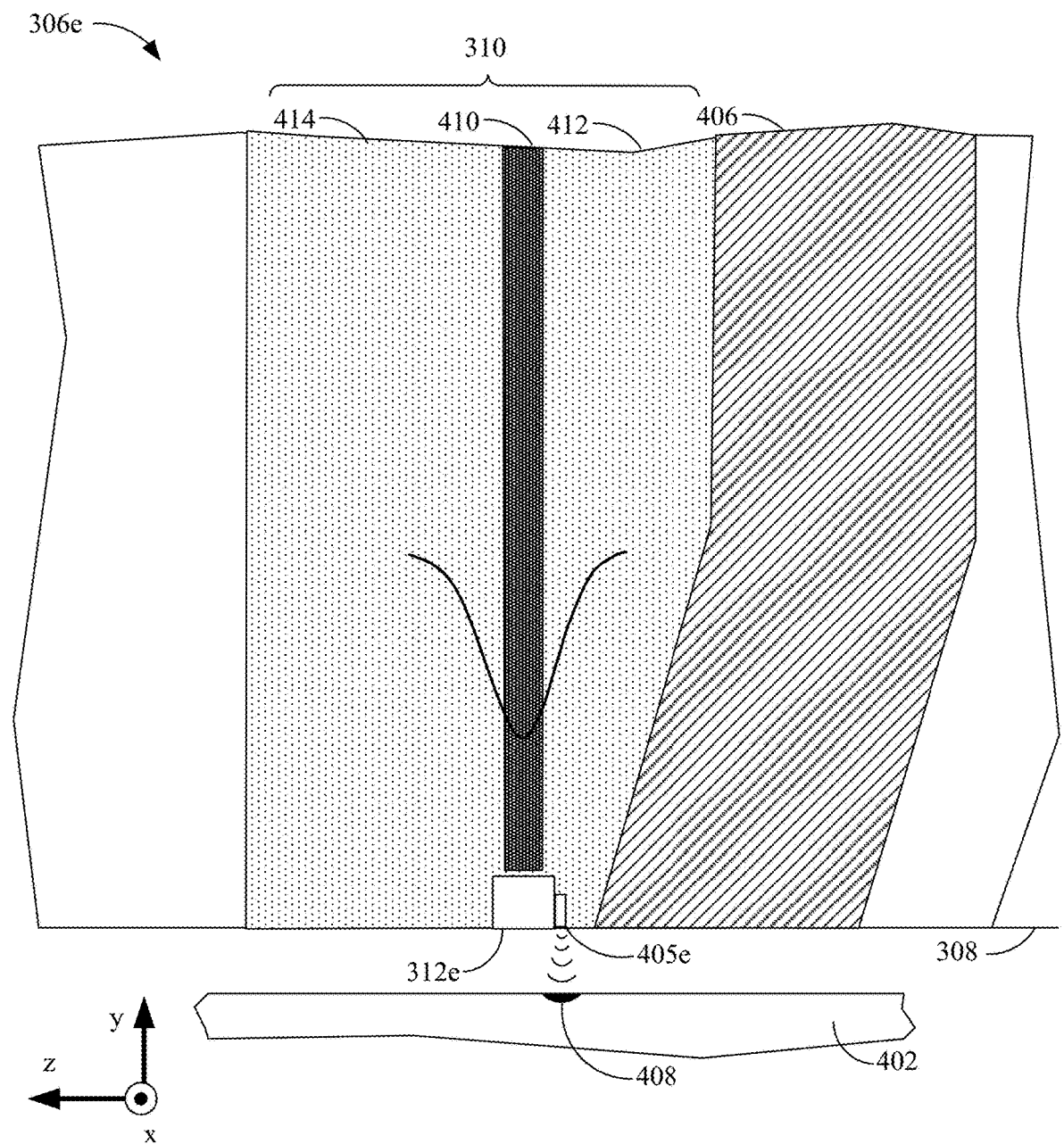
FIG. 4E is a cross-sectional view of a HAMR slider including a fifth configuration of a near-field transducer, in accordance with various embodiments.

With reference to FIG. 3, a perspective view shows a HAMR slider assembly 300 according to an example embodiment. The slider assembly 300 includes a laser diode 302 located on input surface 303 of a slider body 301. In this example, the input surface 303 is a top surface, which is located opposite to a media-facing surface 308 that is positioned over a surface of a recording medium (not shown) during device operation. The media-facing surface 308 faces and is held proximate to the moving medium surface while reading and writing to the medium. The media-facing surface 308 may be configured as an air-bearing surface (ABS) that maintains separation from the medium surface via a thin layer of air.

The laser diode 302 delivers light to a region proximate a HAMR read/write head 306, which is located near the media-facing surface 308. The energy is used to heat the recording medium as it passes by the read/write head 306. Optical coupling components, which may include a mode converting waveguide system 310, are formed integrally within the slider body 301 (near a trailing edge surface 304 in this example) and function as an optical path that delivers energy from the laser diode 302 to the recording media via a NFT 312. The NFT 312 is near the read/write head 306 and causes heating of the medium during recording operations.

The laser diode 302 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 303 of the slider body 301 (e.g., in a pocket or cavity) such that the light is emitted in a direction parallel to (or at least non-perpendicular to) the media-facing surface. A surface-emitting or edge-emitting laser in any of these examples may be directly coupled to the slider body 301, or via an intermediary component such as a submount (not shown). A submount can be used to orient an edge-emitting laser so that its output is directly downwards (negative y-direction in the figure).

While the example in FIG. 3 shows a laser diode 302 directly mounted to the slider body 301, the waveguide system 310 discussed herein may be applicable to any type of light delivery configuration. For example, a laser may be mounted on the trailing edge surface 304 instead of the top surface 303. In another configuration known as free-space light delivery, a laser may be mounted external to the slider 300, and coupled to the slider by way of optic fiber and/or waveguide. An input surface of the slider body 301 may include a grating or other coupling feature to receive light from the laser via the optic fiber and/or waveguide.

With reference now to FIGS. 4A-E, cross-sectional views show details of HAMR devices 306a-306e according to various embodiments. FIGS. 4A-E show different NFT 312a-e configurations. The NFT 312a-e is located proximate a media-facing surface 308 (e.g., ABS), which is held near a magnetic recording media 402 during device operation. The NFT 312a-e includes a peg 405a-e, and may also include a heat sink 407a-d that draws away some heat, e.g., to the write pole 406 or other nearby heat-conductive component. In some embodiments (e.g., FIGS. 4A, 4B, 4D, 4E), the NFT 312a, 312b, 312d, 312e includes an enlarged portion and a peg 405a, 405b, 405d, 405e extending from the enlarged portion in the direction of the air bearing surface 308. In other embodiments (e.g., FIG. 4C), the NFT 312c can be configured as a nanorod. The media-facing surface 308 is arranged parallel to the x-z plane. A waveguide core 410 may be disposed proximate the NFT 312a-e, which is located at or near the media-facing surface 308.

The waveguide core 410 is surrounded by cladding layers 412, 414. The waveguide core 410 and cladding layers 412, 414 may be made from dielectric materials such as $Al_2O_3$, $SiO_xN_y$, $SiO_2$, $Ta_2O_5$, $TiO_2$, $ZnS$, $SiN_x$, $Nb_2O_5$, $AlN$, $HfO_3$, $Y_2O_3$, $Al_xO_y$, etc. Generally, the dielectric materials are selected so that the refractive index of the waveguide core layer 410 is higher than refractive indices of the cladding layers 412, 414. This arrangement of materials facilitates efficient propagation of light through the waveguide 310. Light is delivered from the waveguide core 410 along the negative y-direction where it is coupled to the NFT 312a-e. The NFT 312a-e delivers surface plasmon enhanced, near-field electromagnetic energy along the y-axis where it exits at the media writing surface 402. This results in a highly localized hot spot 408 on the media surface 402 when the media is in close proximity to the media-facing surface 308 of the apparatus 306a-e. Further illustrated in FIGS. 4A-E is a write pole 406 of the read/write head that is located alongside the NFT 312a-e and spaced apart from the peg 405a-e by the NPS region 404. The write pole 406 generates a magnetic field (e.g., perpendicular field) used in changing the magnetic orientation of the hotspot 408 during writing.

As discussed above, the HAMR device is part of an enclosed disc drive having an internal environment/atmosphere influenced by a fill gas. In some disc drives, a low-density, inert gas is used as a fill gas to reduce drag on the moving drive components and facilitate heat distribution (e.g., away from the higher temperature components such as the NFT peg). Examples of primary fill gases include helium, methane, air, nitrogen, and argon. However, in drives using only helium as the fill gas, contamination develops on the slider in the area of the NPS, NFT peg, and write pole. This contamination appears as a black dot, which represents both an area of recession (e.g., a hole) and material build up on the ABS and in the hole. Up to half of the drives using helium as the fill gas exhibited black dot contamination at the peg and NPS. The built-up material is carbon from protective lubricating layers (e.g., on the recording media surfaces) and/or the protective layers on the ABS of the slider (e.g., diamond like carbon) that decomposes in response to the laser light and lack of oxygen in the drive. The resulting amorphous carbon fills the holes thereby altering the recording components. This may be seen in the following FIGS. 5A-C.

Figure 5A:
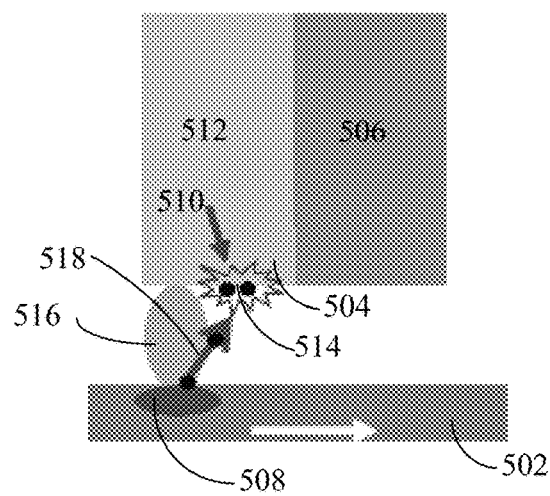
FIG. 5A is a diagram showing initial contamination of a HAMR slider air bearing surface.

FIG. 5A shows the initial development of contamination on a slider ABS. Laser light 516 is emitted from the peg region of the NFT 512 forming hot spot 508 in the recording media 502. The strong near field light from the laser coupled with localized media high temperature decomposes hydrocarbon species, such as in carbon-based lubricating/protective layers on the surface of recording media 502, to distribute amorphous carbon into the drive atmosphere, as indicated by arrow 518. Due to the rotating movement of the recording media 502, this amorphous carbon 514 starts to deposit on the NPS 504. As write operations (and the corresponding conditions) continue, the deposited carbon 514 absorbs laser light reflected from the recording media surface, as indicated by region 510.

Figure 5B:
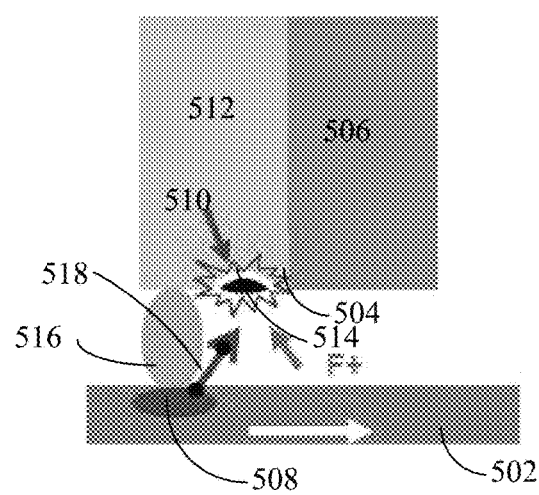
FIG. 5B is a diagram showing contamination of a HAMR slider air bearing surface expanding in the near-field transducer to write pole spacing region of the air bearing surface.
Figure 5C:
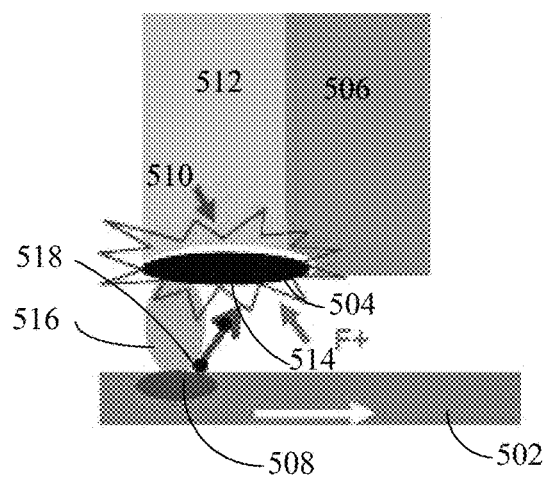
FIG. 5C is a diagram showing contamination of a HAMR slider air bearing surface expanding to the near-field transducer peg and write pole at the air bearing surface.

The light absorption, along with the high anisotropy, increases the temperature of the deposited carbon 514. Thermal or light induced decomposition of materials in the head such as lubricating or other protective layers also releases materials such as carbon and fluorine into the drive environment. These decomposition materials, in combination with the increased temperature, causes the contaminated area to begin to etch a recessed area at the ABS forming a black hole 514 expanding over (and into) the NPS region 504 as shown in FIG. 5B. Depending on the NFT peg material, chemical damage may occur through formation of new materials. For example, if the peg comprises rhodium, the rhodium may react with the fluorine to form rhodium fluoride. Other components present in the slider may also react with the fluorine, such as aluminum components forming aluminum fluoride. As write operations further continue, the black hole 514 expands both along the ABS and further into the slider to damage the NFT peg and/or write pole 506, as shown in FIG. 5C. As the black hole 514 extends along the ABS toward the peg, the black hole 514 causes peg deformation and/or removal. Several factors affect this process including the laser light strength, the amount of carbon supply from the media and slider protective layers, and the chemical supply in the drive (e.g., various component chemical makeups). Certain embodiments described herein are directed to adding a carbon-oxidizing gas to the fill gas to react with, and essentially "burn off" the carbon to prevent amorphous carbon generation/deposition.

Figure 6A:
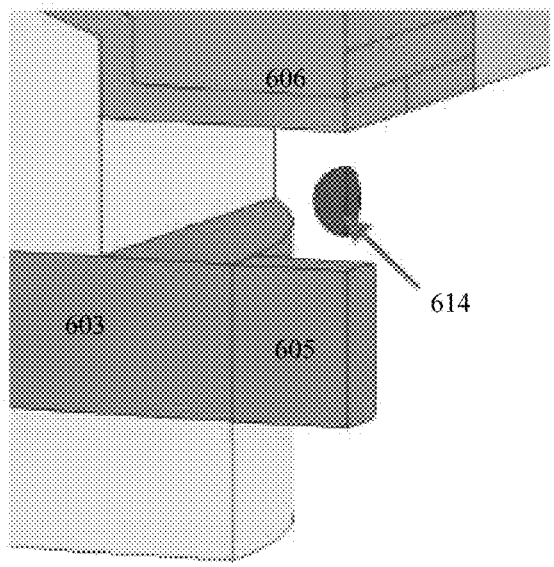
FIG. 6A is a diagram showing contamination on the near-field transducer to write pole spacing region of the air bearing surface.
Figure 6B:
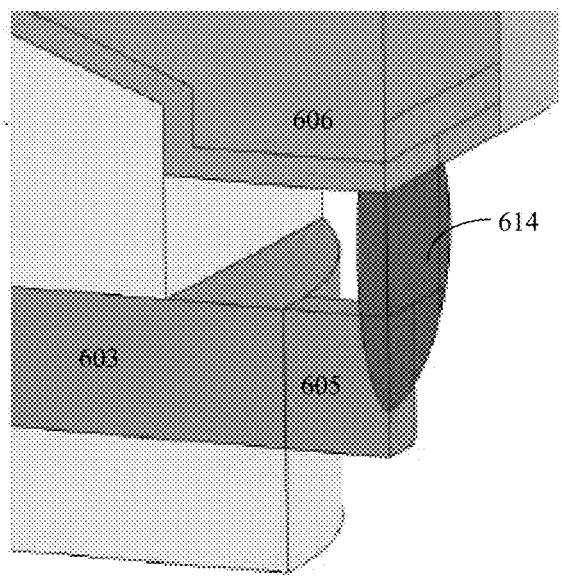
FIG. 6B is a diagram showing the contamination of FIG. 6A expanding to partially cover the near-field transducer peg.
Figure 6C:
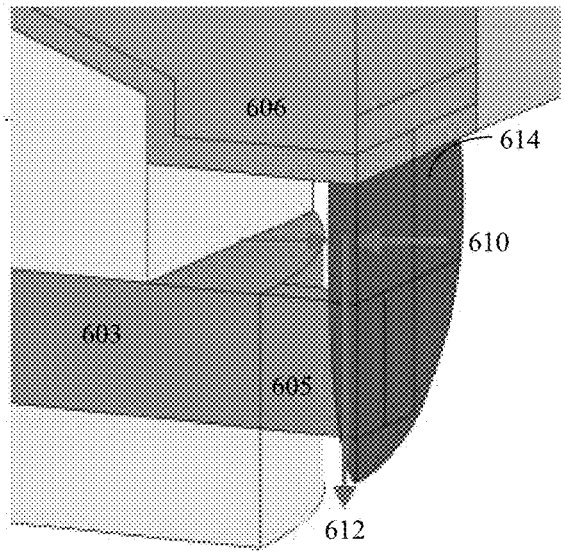
FIG. 6C is a diagram showing the contamination of FIG. 6B expanding to cover the near-field transducer peg.

FIGS. 6A-C illustrate respective sizes of carbon contamination 614 with respect to the NPS, peg, and write pole as the carbon black hole progresses for three modeling scenarios. While the models were created for an NFT having a rhodium peg, the peg could comprise any appropriate material including iridium, gold, rhodium, platinum, palladium, RhIr, AuPt, and their alloys. In FIG. 6A a first model is illustrated where the carbon contamination 614 is only present on the NPS (illustrated by the absence of material between the NFT peg 605 and the write pole 606 for ease of understanding). Here, the NFT is shown as having a peg portion 605 and an enlarged portion 603. In FIG. 6B, a second model is illustrated where the contamination 614 has expanded into the NPS as well as to partially affect the NFT peg 605. The third model, shown in FIG. 6C, shows a further expanded contamination region 614 that further extends into the NPS and covers all of the peg 605. The depth of the contamination 614 into the slider body is depicted with arrows 610 and the radius of the contamination 614 is depicted by arrow 612. These three models were used to analyze effects of the contamination 614 on various aspects of the recording head.

Figure 7A:
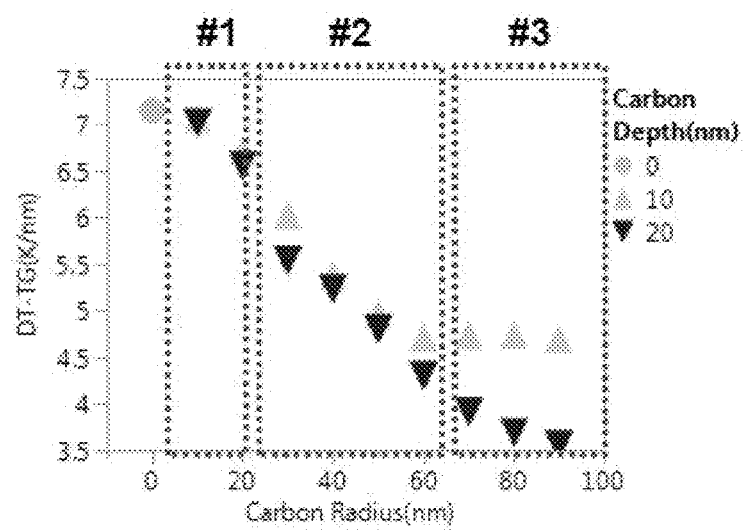
FIG. 7A is a plot showing the downtrack thermal gradient as a function of the contamination radius for the models of FIGS. 6A-C.

FIGS. 7A-F illustrate the modeling results using the scenarios of FIGS. 6A-C. In FIG. 7A, the downtrack thermal gradient is shown as a function of the carbon contamination radius 612. As shown in the legend of FIG. 7A (and which applies to FIGS. 7A-F), the circle data point identifies a carbon depth 610 of 0 nm, an upward facing triangle identifies a carbon depth 610 of 10 nm, and a downward facing triangle identifies a carbon depth 610 of 20 nm. As the contamination radius increases (e.g., expands from the NPS toward the peg), the plot corresponds to the respective models of FIGS. 6A-C. For example, results for the scenario of FIG. 6A are outlined by the box labeled number one, results for the scenario of FIG. 6B are outlined by the box labeled number two, and results for the scenario of FIG. 6C are outlined by the box labeled number three. This correspondence is consistent through FIGS. 7A-F.

Figure 7B:
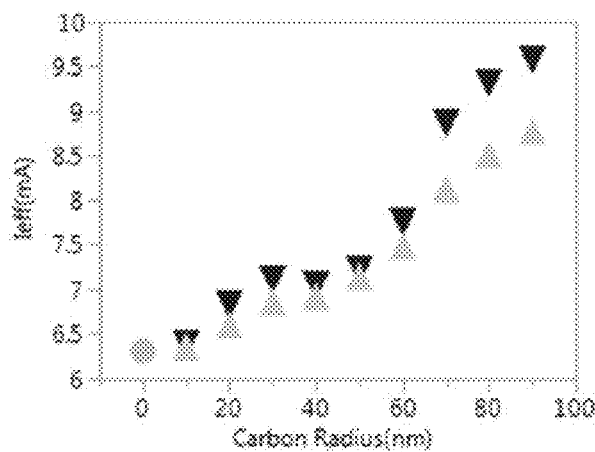
FIG. 7B is a plot showing the effective current as a function of the contamination radius for the models of FIGS. 6A-C.
Figure 7C:
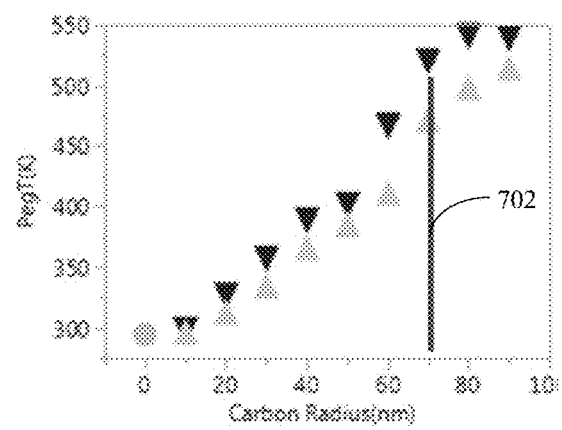
FIG. 7C is a plot showing the peg temperature as a function of the contamination radius for the models of FIGS. 6A-C.
Figure 7D:
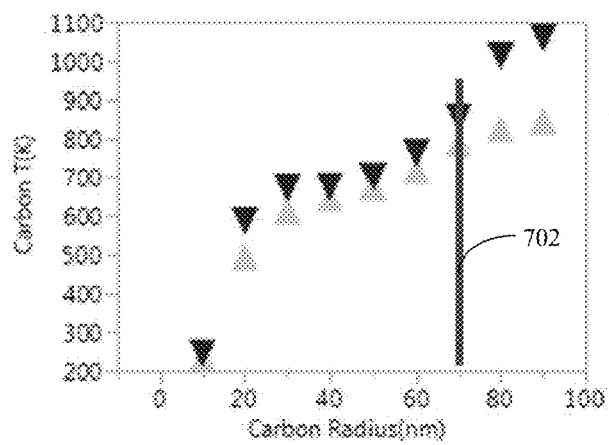
FIG. 7D is a plot showing the carbon contamination temperature as a function of the contamination radius for the models of FIGS. 6A-C.
Figure 7E:
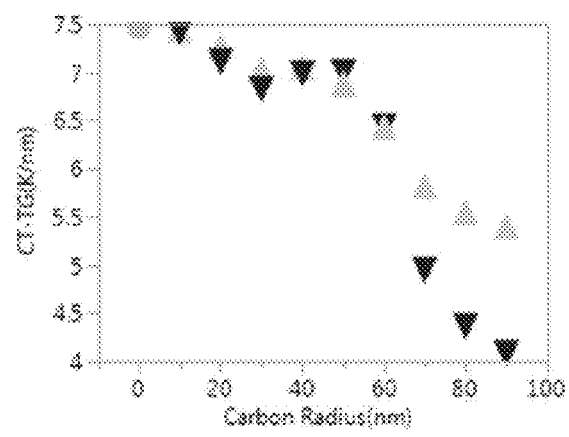
FIG. 7E is a plot showing the crosstrack thermal gradient as a function of the contamination radius for the models of FIGS. 6A-C.
Figure 7F:
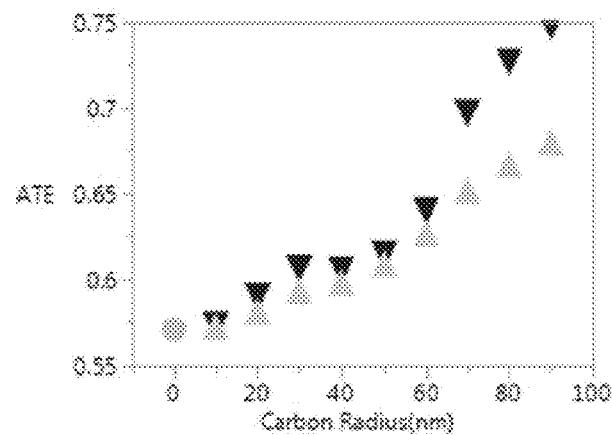
FIG. 7F is a plot showing adjacent track erasure as a function of the contamination radius for the models of FIGS. 6A-C.

In addition to the downtrack thermal gradient, FIG. 7B illustrates the effective current as a function of the carbon contamination radius 612, FIG. 7C illustrates the peg temperature as a function of the carbon contamination radius 612, FIG. 7D illustrates the carbon temperature as a function of the carbon contamination radius 612, FIG. 7E illustrates the crosstrack thermal gradient as a function of the carbon contamination radius 612, and FIG. 7F illustrates the adjacent track erasure as a function of the carbon contamination radius 612.

In general, the modeling shows that the carbon contamination 614 has a negative effect on the thermal gradient and the head temperature. For example, as shown in FIG. 7A, the thermal gradient drops less than 0.6 K/nm if the contamination 614 is confined to the NPS. But it continues to drop 0.6-2.5 K/nm as the contamination 614 grows to cover part of the peg, and drops greater than 2.5 K/nm when the contamination 614 covers the peg 605. As would be expected, FIG. 7B shows that the effective current increases with increased contamination 614 coverage of the ABS. Both FIGS. 7C and 7D confirm that the peg 605 and carbon 614 temperatures increase with increased carbon coverage. The carbon could be the highest temperature source at the ABS. When the contamination 614 covers the NPS and the peg 615, the effective current is increased by fifty percent. This scenario is illustrated by line 702 in FIGS. 7C and 7D, where the peg temperature is greater than 500° C. and the carbon temperature is greater than 900° C., respectively. High effective current together with the peg and carbon temperatures could combine to quickly generate even larger black holes as the write operations continue.

To counteract the creation and growth of the carbon contamination/black holes, embodiments herein are directed to modifying the fill gas for the drive enclosure. For example, the fill gas would contain a mixture of a primary gas (e.g., a low-density, inert gas having high thermal conductivity) and a secondary, oxidizing gas that reacts with the carbon to form a carbon containing gas in the enclosure. This minimizes or prevents the carbon from forming amorphous carbon and depositing on the slider ABS. In one embodiment, oxygen is added to a primary helium fill gas where the oxygen has a concentration in the fill gas of about 1-50%, or in other embodiments 3.1-50%, or in other embodiments 3-20%, or in other embodiments 5-15%, or in other embodiments 9-11%, or in other embodiments 3.1-10%. The oxygen reacts with the carbon to form carbon dioxide as vaporized carbon material instead of deposited amorphous carbon. Experiments have shown that as little as 1% of oxygen in the fill gas reduces black dot formation.

In other embodiments, the oxidizing gas is any gas that reacts with carbon to prevent formation of amorphous carbon. This may include oxygen containing gases such as $H_2O$, NO, $N_2O$, $O_3$, and CO. Similarly, the oxidizing gas may be fluorine or a fluorine containing gas that will react with carbon to form a $CF_x$ gas. In further embodiments, the oxidizing gas may be hydrogen or a hydrogen containing gas that will react with carbon to form a $CH_x$ gas. Any of the oxidizing gases may be combined with any primary fill gas that is sufficient for use in a disc drive enclosure (e.g., low density, high thermal conductivity, and inert). Examples of primary fill gases include helium, methane, nitrogen, and hydrogen, argon.

In certain embodiments, $H_2$ is added to a drive, or a mixture of $H_2$ with He to prevent oxidation of the peg (e.g., a rhodium peg). In another embodiment, CO is the oxidizing gas added to He. In further embodiments, methane is the oxidizing gas added to He. In certain embodiments, CO and $O_2$ are mixed with He to form the fill gas. For any of the embodiments described herein, the above percentages of the oxidizing gas as part of the total fill gas are applicable. If the oxidizing gas content is too high, it could cause oxidation of the peg/write pole and/or affect the flying ability of the head (e.g., by increasing drag on the moving components). However, in certain ratios/mixtures, the oxidizing gas may also help reduce oxidation of the write pole and/or peg in addition to preventing deposition of amorphous carbon.

As previously discussed, the peg of an NFT is subject to high operating temperatures (e.g., >300° C., such as ~400° C.) during write operations. According to various embodiments, the peg comprises rhodium, which is a corrosion-resistant and chemically inert transition metal in the Platinum Group. Although rhodium is oxidation resistant at normal temperatures, it has been found that a rhodium peg exhibits rapid oxidation growth at temperatures associated with write operations. It has been further found that oxidation of a rhodium peg at write operation temperatures occurs in an unsealed air environment or in a sealed helium environment.

In thermodynamics, the stability of an oxide is controlled by the characteristics of the environment that it is exposed to. High temperatures and oxidizing conditions produce oxides, while reducing conditions favor the non-oxidized metal. Oxides form in oxidizing environments and are reduced back to metal in reducing environments. Embodiments are directed to provision of a reducing atmosphere within a HAMR drive that inhibits or prevents oxidation of a rhodium peg at temperatures associated with write operations.

Figure 8:
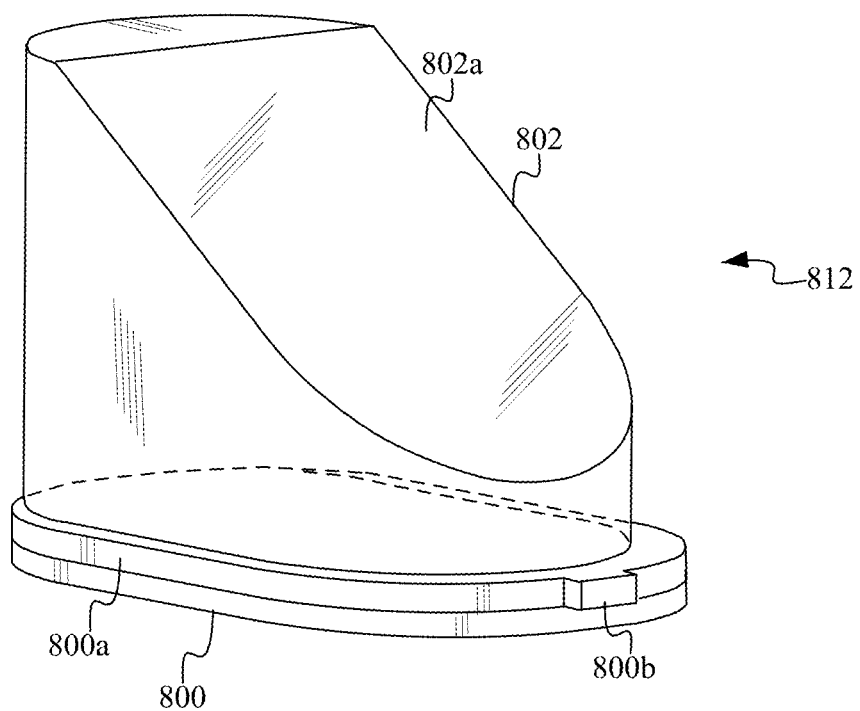
FIG. 8 is a perspective view showing details of a plasmonic device including a near-field transducer, in accordance with various embodiments.

In FIG. 8, a perspective view shows details of a representative plasmonic device including an NFT in accordance with some embodiments. The device 812 can include two parts: a disc 800 and a heat sink 802 proximate to (e.g., deposited directly on to) the disc 800. In this example, the outline of the disc 800 on the xz-plane (which is a substrate-parallel plane) is enlarged relative to the heat sink 802, although they may be the same size. The heat sink 802 can include an angled surface 802a that is located proximate to a write pole (see, e.g., write pole 406 in FIG. 4A) or other heat sinking infrastructure.

The disc 800 includes a top disc 800a that acts as a collector of optical energy from a waveguide and/or focusing element. The disc 800, typically comprising gold, achieves surface plasmon resonance in response to the optical energy and the surface plasmon energy is directed to the medium via a peg 800b comprising rhodium that extends from the disc 800. The peg 800b can have a length of 30-50 nm, for example. It should be noted that the heat sink 802 may also contribute to the energy transfer process and in some such embodiments an NFT does not necessarily include a separate disc and heat sink but a single component that can act as both. In this example, the disc 800 is an enlarged portion of the NFT configured as an elongated plate with rounded (e.g., circular) ends, also referred to as a stadium or capsule shape. Other enlarged portion geometries may be used, including circular, rectangular, triangular, ellipsoidal, parabolic etc.

Embodiments are directed to an approach to rendering rhodium oxide unstable at HAMR drive operating temperatures (~400° C.). It has been determined that provision of a reducing atmosphere within a HAMR drive can inhibit or prevent oxidation of a rhodium peg (e.g., pegs shown in FIGS. 4A-E and 8) at temperatures associated with HAMR operation. For example, hydrogen, carbon monoxide or methane can be added to the sealed gas environment of a HAMR drive to render rhodium oxide unstable, thereby eliminating its formation at the operating temperature of a HAMR NFT.

Carbon monoxide is toxic and dangerous to handle in a manufacturing environment. Although carbon monoxide can be used to provide a rhodium reducing atmosphere within a HAMR drive, hydrogen is preferred. Hydrogen can be handled safely in concentrations of less than 4% by volume. Hydrogen is non-flammable in air below a concentration of 4% by volume. A hydrogen concentration of 0.5% is safe and non-flammable under all conditions.

Embodiments are directed to a hermetically sealed enclosure of a HAMR drive where the NFT comprises a rhodium peg. A fill gas, provided within the enclosure, comprises a hydrogen concentration sufficient to retard oxidation (e.g., render rhodium oxide unstable) of the rhodium peg when the peg is at an operating temperature associated with write operations (e.g., from about 350° C. to about 450° C., such as about 400° C.). In some embodiments, the fill gas comprises a hydrogen concentration of no more than about 4% by volume. In other embodiments, the fill gas comprises a hydrogen concentration of about 0.01% to about 4% by volume. In further embodiments, the fill gas comprises a hydrogen concentration of about 1% to about 2% by volume. In some embodiments, the fill gas comprises a hydrogen concentration of about 0.5% by volume. According to further embodiments, and as discussed in detail below, the fill gas comprises a hydrogen concentration greater than about 4% by volume (e.g., 5-10%) when the fill gas has an oxygen concentration of less than 4.6%.

The extreme HAMR temperature conditions can be used to drive the reduction reaction and reverse rhodium peg oxidation according to the equation $Rh_2O_3 + 3H_2 \rightarrow 2Rh + 3H_2O$, which is a relatively fast endothermic reaction. A sealed HAMR drive can contain a fill gas comprising a small percentage (e.g., 5% or less) of a hydrogen reducing gas ($H_2$, $H_2/N_2$) to drive this reduction reaction during HAMR operation, which will reduce rhodium oxide formed on the NFT peg as a result of diamond like carbon (e.g., protective carbon layer) removal.

As was discussed previously, there is a safety concern with reducing gases (e.g., $H_2$, $CH_4$, CO) contained within a sealed HAMR drive for reversing the effects of thermal oxidation. Keeping the amount of reducing gas below the Lower Flammability Limit (LFL) when mixed with air results in zero flammability concerns (in the presence of heat or ignition sources). Below the LFL, flame ignition cannot occur and flame propagation cannot be supported. The LFL of $H_2$ in air is 4%. The LFL of CO in air is 12%. The LFL of $CH_4$ in air is 4.9%. Keeping the level of these reducing gases below the LFL results in zero chance of ignition within a sealed HAMR drive.

The level of a reducing gas within a sealed HAMR drive can be safely increased above the applicable LFL by limiting the oxygen concentration of the fill gas. Flame cannot be initiated/supported without a minimum oxygen concentration present in the fill gas mixture. The Limiting Oxygen Concentration (LOC) for $H_2$ is 4.6%. The LOC for CO is 5.1%. The LOC for $CH_4$ is 10-11%. Keeping the oxygen level below the applicable LOC for these gases keeps ignition risk at zero.

The amount of reducing gas can be increased above the applicable LFL by keeping the oxygen level below the applicable LOC for the reducing gas. For example, the percentage of $H_2$ in a sealed HAMR drive can be increased above 4% (e.g., 5-10%, 6-9%, 7-8%) by keeping the LOC below 4.6%. In another example, the percentage of CO in a sealed HAMR drive can be increased above 12% (e.g., 13-35%, 15-25%, 16-20%) by keeping the LOC below 5.1%. In a further example, the percentage of $CH_4$ in a sealed HAMR drive can be increased above 4.9% (e.g., 5-12%, 6-10%, 7-8%) by keeping the LOC below 10-11%.

EXAMPLE

For a sealed HAMR drive at 25° C. and 10% Relative Humidity (RH), the partial pressure of $H_2O$ is $3 \times 10^{-3}$ atm. Adding 0.5% by volume of hydrogen to a fill gas mixture of helium+1% air (net 0.26% $O_2$) would make the $H_2$:$H_2O$ ratio close to a value of 1.0 and provide margin against $H_2$ loss over time due to adsorption on the surfaces of internal drive components or due to permeation through the drive enclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:
1. An apparatus, comprising:
a hermetically sealed enclosure;
a heat-assisted magnetic recording device disposed in the enclosure, the device including a slider comprising:
a reader and a writer;

an optical waveguide configured to couple light from a light source to a near-field transducer situated at or near an air bearing surface of the slider;

the near-field transducer comprising an enlarged portion and a peg extending from the enlarged portion in a direction of the air bearing surface, the peg comprising rhodium; and a fill gas provided within the enclosure, the fill gas comprising a hydrogen concentration sufficient to retard oxidation of the peg when the peg is at an operating temperature associated with write operations, wherein the hydrogen concentration is no more than about 4% by volume.

2. The apparatus of claim 1, wherein the operating temperature of the peg associated with write operations ranges from about 350° C. to about 450° C.

3. The apparatus of claim 1, wherein the hydrogen concentration is about 0.5% to about 2% by volume.

4. The apparatus of claim 1, wherein the hydrogen concentration is about 0.5% by volume.

5. The apparatus of claim 1, wherein the fill gas comprises air.

6. The apparatus of claim 1, wherein the fill gas comprises helium.

7. The apparatus of claim 1, wherein the fill gas comprises helium and air.

8. An apparatus, comprising:

a hermetically sealed enclosure;

a heat-assisted magnetic recording device disposed in the enclosure, the device including a slider comprising:

a reader and a writer;

an optical waveguide configured to couple light from a light source to a near-field transducer situated at or near an air bearing surface of the slider;

the near-field transducer comprising an enlarged portion and a peg extending from the enlarged portion in a direction of the air bearing surface, the peg comprising rhodium; and a fill gas provided within the enclosure, the fill gas comprising a hydrogen concentration sufficient to retard oxidation of the peg when the peg is at an operating temperature associated with write operations, wherein the hydrogen concentration ranges from about 5% to about 10% by volume with an oxygen concentration below 4.6% by volume.

9. The apparatus of claim 8, wherein the operating temperature of the peg associated with write operations ranges from about 350° C. to about 450° C.

10. The apparatus of claim 8, wherein the fill gas comprises helium.

11. The apparatus of claim 8, wherein the fill gas comprises helium and air.

12. An apparatus, comprising:

a hermetically sealed enclosure;

a heat-assisted magnetic recording device disposed in the enclosure, the device including a slider comprising:

a reader and a writer;

an optical waveguide configured to couple light from a light source to a near-field transducer situated at or near an air bearing surface of the slider;

the near-field transducer comprising an enlarged portion and a peg extending from the enlarged portion in a direction of the air bearing surface, the peg comprising rhodium; and a fill gas provided within the enclosure, the fill gas comprising a methane concentration sufficient to retard oxidation of the peg when the peg is at an operating temperature associated with write operations, wherein the methane concentration ranges from about 5% to about 12% by volume with an oxygen concentration below 11% by volume.

13. The apparatus of claim 12, wherein the fill gas comprises helium.

* * * * *